United States Patent
Ruellan et al.

(10) Patent No.: US 10,419,573 B2
(45) Date of Patent: Sep. 17, 2019

(54) METHODS, DEVICES AND COMPUTER PROGRAMS ENABLING DATA TO BE PUSHED IN A NETWORK ENVIRONMENT COMPRISING PROXIES

(71) Applicant: CANON KABUSHIKI KAISHA, Tokyo (JP)

(72) Inventors: Hervé Ruellan, Rennes (FR); Romain Bellessort, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 15/217,562

(22) Filed: Jul. 22, 2016

(65) Prior Publication Data
US 2017/0026483 A1 Jan. 26, 2017

(30) Foreign Application Priority Data
Jul. 24, 2015 (GB) .................................. 1513131.1

(51) Int. Cl.
*H04L 29/08* (2006.01)

(52) U.S. Cl.
CPC .......... *H04L 67/2842* (2013.01); *H04L 67/02* (2013.01); *H04L 67/26* (2013.01)

(58) Field of Classification Search
CPC ..... H04L 67/2842; H04L 67/26; H04L 67/02; H04L 67/16; G06F 9/455; G06F 9/50; G06F 9/5077

USPC .......................................................... 709/217
See application file for complete search history.

(56) References Cited

U.S. PATENT DOCUMENTS

2013/0268673 A1* 10/2013 Graham-Cumming .................... H04L 67/2828
                                                                                 709/226
2015/0019676 A1    1/2015 Fablet

FOREIGN PATENT DOCUMENTS

WO         2015/004276 A2    1/2015

* cited by examiner

*Primary Examiner* — Tu T Nguyen
(74) *Attorney, Agent, or Firm* — Canon U.S.A., Inc. IP Division

(57) ABSTRACT

The present invention relates to optimizing pushing of at least one resource associated with a main resource, in response to a request for this main resource, in an intermediary component comprising a cache memory. After having sent a request for a main resource to a second component different from the intermediary component, at least one identifier of at least one resource to be pushed by the second component is received from the second component in response to the sent request. Then, at least one of said at least one received identifier is stored in a list associated with the main resource, the list being stored in the cache memory.

31 Claims, 5 Drawing Sheets

METHODS, DEVICES AND COMPUTER PROGRAMS ENABLING DATA TO BE PUSHED IN A NETWORK ENVIRONMENT COMPRISING PROXIES

This application claims the benefit under 35 U.S.C. § 119(a)-(d) of United Kingdom Patent Application No. 1513131.1, filed on Jul. 24, 2015 and entitled "methods, devices and computer programs enabling data to be pushed in a network environment comprising proxies". The above cited patent application is incorporated herein by reference in its entirety.

FIELD OF THE INVENTION

The present invention relates in general to transmission of data between a server and a client device in a communication network comprising proxies, and in particular to methods, devices and computer programs enabling data to be pushed in a communication network environment comprising proxies.

BACKGROUND OF THE INVENTION

HTTP (HyperText Transfer Protocol) is an application protocol used on top of the TCP/IP (Transmission Control Protocol/Internet Protocol) used to transfer data over the Internet. HTTP is the protocol used to exchange or transfer hypertext. It functions as a request-response protocol in the client-server computing model. Accordingly, to obtain data, a client device sends an HTTP request to a server to obtain this data (or resource) and, in response, the server sends back the data to the client device inside an HTTP response.

It is noted that a web page displayed by a web browser is generally made up of many resources, typically about one hundred elements, also referred to as auxiliary resources. For the sake of illustration, these resources can be HTML (HyperText Markup Language) resources (structuring the content of the page), CSS (Cascading Style Sheets) resources (describing the layout and the style of the content), JavaScript resources (providing dynamic behaviour for the page), image resources and other media or font resources.

In order to display a web page, a client device sends a request to a server for obtaining the main HTML resource. Once it has received this HTML resource, it parses it to identify other resources that are needed to display the web page. Each time a resource is identified, the client sends a corresponding request to the server. Such a parsing process is repeated for each newly requested resource.

For example, upon parsing a main HTML resource, a client device may identify a link to a CSS stylesheet. Upon identification, it requests this stylesheet from the server. Then, when parsing the CSS stylesheet after it has been received, the client device may determine that the stylesheet refers to an image to be used as a background of the web page. Therefore, it will also request this image from the server.

FIG. 1, comprising FIGS. 1a to 1c, illustrates examples of the structure of HTML web pages formed from several resources (i.e. comprising several elements).

As illustrated in FIG. 1a, web page 100 is composed of a main HTML resource denoted H1 that uses a JavaScript resource, denoted JS1, for handling some dynamic content, and that uses a CSS resource, denoted CSS1, for styling the HTML content of H1.

The structure of web page 105 illustrated in FIG. 1b is more complex than the one of web page 100 in that CSS resource CSS1 comprises a sub-resource consisting of an image denoted IMG1, for example an image to be used as the background of the web page 105.

It is to be noted that both web pages 100 and 105 are simplified examples in comparison to actual web pages. However, although the number of resources of actual web pages may be far greater than the number of resources of web pages 100 and 105, the structures of the web pages are very close.

In order to display these web pages, the client device should first obtain HTML resource H1. In response to this request, the server sends the HTML resource to the client device.

Once received, HTML resource H1 is parsed to identify the JS1 and CSS1 resources that are needed to display the web page. After they have been identified, they are requested. Likewise, the IMG1 resource is requested after it is identified when parsing the CSS1 resource.

It is observed here that web pages are often dynamic.

FIG. 1c illustrates an updated version of web page 100 illustrated in FIG. 1a, denoted 100'. As illustrated, the CSS resource is no longer CSS1. It has been replaced by CSS2. Accordingly, when parsing the HTML resource H1, after the web page has been updated, the client device will no longer request the CSS1 resource but will request the CSS2 resource.

HTTP defines several methods for client devices to request data (a method enables a client device to specify the semantic of its request).

Among these methods, the GET method makes it possible for a client device to retrieve a resource from a server. To that end, an identifier of the resource is typically specified by a URL (Uniform Resource Locator) included within the request and possibly by other parameters. The HEAD method is similar to the GET method, however, it aims at obtaining only metadata associated with the identified resource from a server (and not the resource itself).

In order to optimize data communication between servers and client devices, HTTP defines a mechanism allowing a client device or an intermediary component (that may be, in particular, an independent device or a part of a client device) to store resources received from a server in a temporary memory (known as a cache memory). This allows a client device to reuse resources that have been previously received without requesting them again from a server.

For the sake of illustration, since a logo of a company is typically displayed on all the pages of the web site of that company, it is advantageously stored after it has been received so as to be reused to display other pages of the same web site.

The mechanism provided by HTTP for storing resources in cache memories handles various aspects.

According to a first aspect, servers receiving HTTP requests and transmitting data in response to that request are able to specify whether a resource sent in a response to a request can be stored in a cache memory.

For example, a server of a news website may decide that the HTML content of the site's main page is not cacheable (i.e. should not be memorized in a cache memory), as it changes often, whereas the image corresponding to the site's logo is cacheable, as it doesn't change often.

According to a second aspect, servers receiving HTTP requests and transmitting data in response to those requests can specify a validity period for a resource (i.e. how long the resource can be considered as valid) that is to say the period during which the resource stored in a cache memory can be used.

This validity period is referred to as the freshness of the cached resource. A cached resource that can be reused is called fresh and a cached resource that can no longer be reused is called stale.

The server can specify the freshness lifetime of a resource it sends in two ways, either by using an 'Expires' header field that defines the date at which the resource contained in the response becomes stale or by using a 'max-age' directive that defines the age at which the resource becomes stale.

It is to be noted that a conditional request can be used to validate a stale resource that is still stored in a cache memory. In response to a conditional request, the new version of the resource is sent if it is no longer valid (e.g. if it has been updated) while a predetermined short response is sent if the resource is still valid (e.g. the status code '304 Not Modified', referred to as the 304 status code in the description). There are two ways for identifying the version of a resource: the entity-tag associated with the version by the server and the date of the last modification of the resource by the server.

In order to optimize the transfer of data between a server and a client device, HTTP/2 makes it possible for a server to push data that have not been requested by a client device.

More precisely, a server can send a push promise to a client device to forewarn the latter that the server is intending to push a resource to it. This push promise contains a request to which the pushed resource is a response. Basically, the push promise contains a URI (Uniform Resource Identifier) of the resource the server is intending to push. This enables the client to know what the server is promising. The push promise is made by sending a frame of the PUSH_PROMISE type. After having sent the push promise, the server sends the promised resource in the same way it would send a response corresponding to a client's request.

It is to be noted that a server can only push resources that are in relation to a request sent by a client. More specifically, a PUSH_PROMISE frame identifies both a client request and a resource that will be pushed.

Turning back to FIGS. 1a and 1b, a server can take advantage of HTTP/2 push feature by pushing the auxiliary resources to improve the loading time of the page. In such a case, JS1 and CSS1 resources (FIG. 1a) and JS1, CSS1, and IMG1 resources (FIG. 1b) can be pushed in response to the request directed to H1 resource.

For the sake of illustration, Jetty is an open source Web server that supports the HTTP/2 push feature. To decide which resources to push in response to a request, Jetty records client device requests. Upon receiving a request for a first resource, Jetty monitors for two seconds all the requests coming from the same client device. Any request referring to the first resource (as determined by the 'Referer' header field) is assumed to be useful for the client device to process the first resource and is therefore added to the list of resources to be pushed upon receiving a request for the first resource.

It is to be noted that if a caching proxy arranged between a client device and a server is used to reply to a request from this client device, resources should be pushed in a similar way.

In HTTP, a proxy is an intermediary that sits between the client and the server. Depending on its purpose, it may simply watch the HTTP traffic between a client device and a server or it may modify it. Examples of proxies include firewalls, logging proxies, and caching proxies.

A caching proxy makes it possible to decrease the response time to a client device request. To that end, the caching proxy passes responses received from servers to the requesting client devices and stores the responses along with information regarding the corresponding requests. Then, when the same request is received again, the caching proxy is able to directly reply to the client device by retrieving the stored response. This enables the client device to receive the response faster and also to decrease the data traffic between the proxy and the server.

An HTTP caching proxy follows the rules defined by the HTTP Caching mechanism. In particular, when a stored response is stale, it should be validated by a server before being transmitted to a client.

Accordingly, a caching proxy sitting between a client and a server is able to reply to requests of the client in place of the server, decreasing the response time as seen from the client device.

The HTTP/2 push feature also makes it possible to increase the responsiveness viewed from the client device end since a server transmits resources to the client device without waiting for the client device to request them.

However, combining a caching proxy and the HTTP/2 push feature is complex since a server (having the knowledge of which resources are to be pushed in regard to a particular request) is not contacted by a caching proxy to respond to a request when the response is cached. Therefore, in order for a client device to receive pushed resources when the caching proxy is replying to a request, the knowledge of the server has to be transmitted to the caching proxy. This leads to duplicating the knowledge and increasing processing resources of caching proxies.

It should be noted that the HTTP/2 push feature is defined hop-by-hop: there are no constraints in the HTTP/2 specification for establishing a relation between resources pushed by a server to a proxy in response to a given request and resources pushed by the proxy to a client in response to the same request. The proxy may push the same resources, it may push only some of them, or it may push other resources.

Consequently, there is a need for improving the mechanism used by a proxy for pushing resources, in particular for pushing cached resources.

SUMMARY OF THE INVENTION

The present invention has been devised to address one or more of the foregoing concerns.

In this context, there is provided a solution enabling data to be pushed from a server to a client device through one or more proxies.

According to a first object of the invention, there is provided a method for for optimizing pushing of at least one resource associated with a main resource, in response to a request for this main resource, the method being carried out in an intermediary component comprising a cache memory, the method comprising:

sending a request for a main resource to a second component different from the intermediary component;

receiving from the second component at least one identifier of at least one resource to be pushed by the second component in response to the sent request; and storing at least one of said at least one received identifier in a list associated with the main resource, the list being stored in the cache memory.

Therefore, the method of the invention makes it possible to optimize the use of the bandwidth between proxies and application servers and to improve the responsiveness for pushing resources in a communication network comprising proxies.

In an embodiment, the method further comprises a step of receiving the request for the main resource.

In an embodiment, the list is stored in association with the main resource and in association with an item of information, the item of information being an item of information sent to the second component as part of the request for the main resource and being different from an identifier of the main resource.

In an embodiment, at least one received identifier is received as a part of the pushed transmission of a resource corresponding to said at least one received identifier by the second component.

In an embodiment, the pushed transmission of a resource by the second component comprises metadata related to the resource corresponding to said at least one identifier of the at least one received identifier.

In an embodiment, pushed transmission of a resource by the second component comprises the resource.

In an embodiment, the method further comprises the steps of,
 receiving a second request for the main resource;
 obtaining a list associated with the main resource, the list being obtained as a function of the main resource requested in the second request; and
 selecting at least one identifier of at least one resource listed in the obtained list.

In an embodiment, the list is obtained as a function of the main resource requested in the second request and as a function of an item of information of the second request, the item of information of the second request being different from an identifier of the main resource.

In an embodiment, the obtaining step comprises the steps of,
 identifying a plurality of lists associated with the main resource, the lists being identified as a function of the main resource requested in the second request; and
 selecting one of the identified lists as a function of an item of information of the second request, the item of information being different from an identifier for the main resource.

In an embodiment, the method further comprises steps of obtaining and pushing metadata related to the at least one resource corresponding to the at least one selected identifier, in response to the second request.

In an embodiment, the method further comprises steps of obtaining and pushing the at least one resource corresponding to the at least one selected identifier, in response to the second request.

In an embodiment, the method further comprises a step of checking whether or not the at least one resource corresponding to the at least one selected identifier is stored in the cache memory.

In an embodiment, the method further comprises steps of requesting and receiving the at least one resource corresponding to the at least one selected identifier if it is determined that the at least one resource corresponding to the at least one selected identifier is not stored in the cache memory, the at least one resource corresponding to the at least one selected identifier being requested from the second component.

In an embodiment, the method further comprises a step of checking whether or not the at least one resource corresponding to the at least one selected identifier is valid.

In an embodiment, the method further comprises a step of requesting the at least one resource corresponding to the at least one selected identifier if it is determined that the at least one resource corresponding to the at least one selected identifier is not valid, the at least one resource corresponding to the at least one selected identifier being requested from the second component.

In an embodiment, the at least one resource corresponding to the at least one selected identifier is received in response to requesting the at least one resource corresponding to the at least one selected identifier.

In an embodiment, the method further comprises a step of storing in the cache memory the at least one received resource corresponding to the at least one selected identifier.

In an embodiment, only metadata indicating that the at least one resource corresponding to the at least one selected identifier is still valid are received in response to requesting the at least one resource corresponding to the at least one selected identifier.

In an embodiment, the method further comprises a step of checking whether or not the requested main resource is stored in the cache memory of the intermediary component and whether or not the requested main resource stored in the cache memory is valid.

In an embodiment, the second request for the main resource is forwarded to the second component as a conditional request.

In an embodiment, the method further comprises a step of receiving at least one response to a request for the main resource in response to forwarding the second request.

In an embodiment, the at least one response to the request for the main resource comprises the resource associated with the main resource.

In an embodiment, the method further comprises a step of storing in the cache memory the received main resource.

In an embodiment, the at least one response to the request for the main resource comprises only metadata associated with the resource associated with the main resource.

In an embodiment, the received metadata indicate that a corresponding resource stored in the cache memory is valid.

In an embodiment, the obtained list is ordered so that the resources identified in the obtained list can be pushed in a particular order.

In an embodiment, the obtained list comprises information about how the resources identified in the obtained list are to be pushed.

In an embodiment, the method further comprises:
 receiving a cancelation request for a resource being pushed;
 modifying the obtained list by removing from the obtained list an identifier of the resource being pushed.

In an embodiment, the method further comprises:
 receiving a request for a resource referring the main resource;
 modifying the obtained list by adding to the obtained list an identifier of the resource referring the main resource.

In an embodiment, the step of modifying the obtained list is carried out after receiving a plurality of similar requests.

According to a second object of the invention, there is provided a method for pushing at least one resource associated with a main resource, in response to a request for this main resource, the method being carried out in a server, the method comprising:
 receiving from a requester a request for a main resource;
 identifying at least one resource associated with the main resource, the at least one resource being a resource to be pushed in response to a request for the main resource;
 determining whether or not the at least one identified resource associated with the main resource is to be pushed in response to the received request; and if it is determined that the at least one identified resource associated with the main resource is not to be pushed, pushing only metadata associated with the at least one identified resource in response to the request for the main resource.

Therefore, the method of the invention makes it possible to optimize the use of the bandwidth between proxies and application servers and to improve the responsiveness for pushing resources in a communication network comprising proxies.

In an embodiment, the method further comprises a step of determining whether or not the requester has the main resource and has a correct version of the main resource and, if the requester has the main resource and has a correct version of the main resource, transmitting metadata of the main resource to the requester to inform the requester that the main resource is unchanged; and if the requester does not have the main resource or does not have a correct version of the main resource, transmitting the main resource to the requester.

In an embodiment, the method further comprises, if the requester does not have the main resource or does not have the correct version of the main resource, steps of, determining whether or not the at least one identified resource is to be pushed in response to the received request; and if it is determined that the at least one identified resource is not to be pushed in response to the received request, pushing metadata indicating that the at least one identified resource is to be pushed in response to requesting the main resource; and if it is determined that the at least one identified resource is to be pushed in response to the received request, pushing the at least one identified resource with the main resource.

In an embodiment, the method further comprises, if the requester has the main resource and has the correct version of the main resource, steps of, determining whether or not the requester has the at least one identified resource; and if it is determined that the requester has the at least one identified resource, and that it is further determined that this at least one identified resource is no longer valid for the requester and that this at least one identified resource is unchanged, pushing metadata indicating that the validity of the at least one identified resource is to be extended; and if it is determined that the requester does not have the at least one identified resource, pushing the at least one identified resource.

According to a third object of the invention, there is provided a device for optimizing pushing at least one resource associated with a main resource, in response to a request for this main resource, the device comprising a cache memory and a processor configured for carrying out the steps of:

sending a request for a main resource to a second component different from the intermediary component;

receiving from the second component at least one identifier of at least one resource to be pushed by the second component in response to the sent request; and storing at least one of said at least one received identifier in a list associated with the main resource, the list being stored in the cache memory.

Therefore, the device of the invention makes it possible to optimize the use of the bandwidth between proxies and application servers and to improve the responsiveness for pushing resources in a communication network comprising proxies.

In an embodiment, the processor is further configured to carry out a step of receiving the request for the main resource.

In an embodiment, the list is stored in association with the main resource and in association with an item of information, the item of information being an item of information sent to the second component as part of the request for the main resource and being different from an identifier of the main resource.

In an embodiment, at least one received identifier is received as a part of the pushed transmission of a resource corresponding to said at least one received identifier by the second component.

In an embodiment, the pushed transmission of a resource by the second component comprises metadata related to the resource corresponding to said at least one identifier of the at least one received identifier.

In an embodiment, pushed transmission of a resource by the second component comprises the resource.

In an embodiment, the processor is further configured to carry out the steps of, receiving a second request for the main resource;

obtaining a list associated with the main resource, the list being obtained as a function of the main resource requested in the second request; and selecting at least one identifier of at least one resource listed in the obtained list.

In an embodiment, the list is obtained as a function of the main resource requested in the second request and as a function of an item of information of the second request, the item of information of the second request being different from an identifier of the main resource.

In an embodiment, the processor is further configured so that the obtaining step comprises the steps of, identifying a plurality of lists associated with the main resource, the lists being identified as a function of the main resource requested in the second request; and selecting one of the identified lists as a function of an item of information of the second request, the item of information being different from an identifier for the main resource.

In an embodiment, the processor is further configured to carry out steps of obtaining and pushing metadata related to the at least one resource corresponding to the at least one selected identifier, in response to the second request.

In an embodiment, the processor is further configured to carry out steps of obtaining and pushing the at least one resource corresponding to the at least one selected identifier, in response to the second request.

the processor is further configured to carry out a step of checking whether or not the at least one resource corresponding to the at least one selected identifier is stored in the cache memory.

In an embodiment, the processor is further configured to carry out steps of requesting and receiving the at least one resource corresponding to the at least one selected identifier if it is determined that the at least one resource corresponding to the at least one selected identifier is not stored in the cache memory, the at least one resource corresponding to the at least one selected identifier being requested from the second component.

In an embodiment, the processor is further configured to carry out a step of checking whether or not the at least one resource corresponding to the at least one selected identifier is valid.

In an embodiment, the processor is further configured to carry out a step of requesting the at least one resource corresponding to the at least one selected identifier if it is determined that the at least one resource corresponding to the at least one selected identifier is not valid, the at least one resource corresponding to the at least one selected identifier being requested from the second component.

In an embodiment, the at least one resource corresponding to the at least one selected identifier is received in response to requesting the at least one resource corresponding to the at least one selected identifier.

In an embodiment, the processor is further configured to carry out a step of storing in the cache memory the at least one received resource corresponding to the at least one selected identifier.

In an embodiment, only metadata indicating that the at least one resource corresponding to the at least one selected identifier is still valid are received in response to requesting the at least one resource corresponding to the at least one selected identifier.

In an embodiment, the processor is further configured to carry out a step of checking whether or not the requested main resource is stored in the cache memory of the intermediary component and whether or not the requested main resource stored in the cache memory is valid.

In an embodiment, the processor is further configured so that the second request for the main resource is forwarded to the second component as a conditional request.

In an embodiment, the processor is further configured to carry out a step of receiving at least one response to a request for the main resource in response to forwarding the second request.

In an embodiment, the at least one response to the request for the main resource comprises the resource associated with the main resource.

In an embodiment, the processor is further configured to carry out a step of storing in the cache memory the received main resource.

In an embodiment, the at least one response to the request for the main resource comprises only metadata associated with the resource associated with the main resource.

In an embodiment, the received metadata indicate that a corresponding resource stored in the cache memory is valid.

In an embodiment, the obtained list is ordered so that the resources identified in the obtained list can be pushed in a particular order.

In an embodiment, the obtained list comprises information about how the resources identified in the obtained list are to be pushed.

In an embodiment, the processor is further configured to carry out:
receiving a cancelation request for a resource being pushed;
modifying the obtained list by removing from the obtained list an identifier of the resource being pushed.

In an embodiment, the processor is further configured to carry out steps of:
receiving a request for a resource referring the main resource;
modifying the obtained list by adding to the obtained list an identifier of the resource referring the main resource.

In an embodiment, the processor is further configured so that the step of modifying the obtained list is carried out after receiving a plurality of similar requests.

According to a fourth object of the invention, there is provided a server for pushing at least one resource associated with a main resource, in response to a request for this main resource, the server comprising a processor configured for carrying out the steps of:
receiving from a requester a request for a main resource;
identifying at least one resource associated with the main resource, the at least one resource being a resource to be pushed in response to a request for the main resource;
determining whether or not the at least one identified resource associated with the main resource is to be pushed in response to the received request; and
if it is determined that the at least one identified resource associated with the main resource is not to be pushed, pushing only metadata associated with the at least one identified resource in response to the request for the main resource.

Therefore, the server of the invention makes it possible to optimize the use of the bandwidth between proxies and application servers and to improve the responsiveness for pushing resources in a communication network comprising proxies.

In an embodiment, the processor is further configured to carry out a step of determining whether or not the requester has the main resource and has a correct version of the main resource and,
if the requester has the main resource and has a correct version of the main resource, transmitting metadata of the main resource to the requester to inform the requester that the main resource is unchanged; and
if the requester does not have the main resource or does not have a correct version of the main resource, transmitting the main resource to the requester.

In an embodiment, the processor is further configured to carry out, if the requester does not have the main resource or does not have the correct version of the main resource, steps of,
determining whether or not the at least one identified resource is to be pushed in response to the received request; and
if it is determined that the at least one identified resource is not to be pushed in response to the received request, pushing metadata indicating that the at least one identified resource is to be pushed in response to requesting the main resource; and
if it is determined that the at least one identified resource is to be pushed in response to the received request, pushing the at least one identified resource with the main resource.

In an embodiment, the processor is further configured to carry out, if the requester has the main resource and has the correct version of the main resource, steps of,
determining whether or not the requester has the at least one identified resource; and
if it is determined that the requester has the at least one identified resource, and that it is further determined that this at least one identified resource is no longer valid for the requester and that this at least one identified resource is unchanged, pushing metadata indicating that the validity of the at least one identified resource is to be extended; and
if it is determined that the requester does not have the at least one identified resource, pushing the at least one identified resource.

In an embodiment,

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1, comprising

FIG. 2, comprising

DETAILED DESCRIPTION OF EMBODIMENTS OF THE INVENTION

According to embodiments, a set of rules is defined for enabling a server to transmit to a caching proxy, in an implicit way, an indication of which resources are to be pushed in regard to a particular request. The caching proxy can be an independent device arranged between a client device and a server, or can be a component or module of a client device, for example a web browser, or can be a component or module of the server, for example a front-end server.

FIG. 2, comprising FIGS. 2a to 2e, illustrates several scenarios of embodiments of the invention for caching and pushing data to a client device in an environment in which the client device is connected to a server via a proxy.

The algorithms used for carrying out the steps illustrated in FIGS. 2a to 2e are described by reference to FIGS. 3 and 4.

For the sake of clarity, it is assumed that the proxy knows the state of the client device's cache and that the server knows the state of the proxy's cache. Such knowledge can be based on a standard mechanism.

Figure 1A:
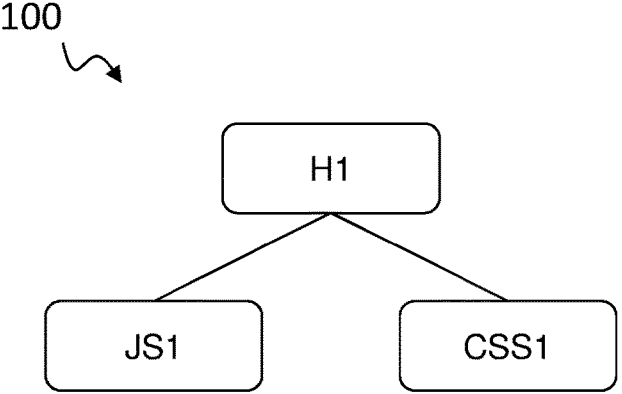
FIGS. 1a to 1c, illustrates examples of the structure of HTML web pages composed of several resources.
Figure 2A:
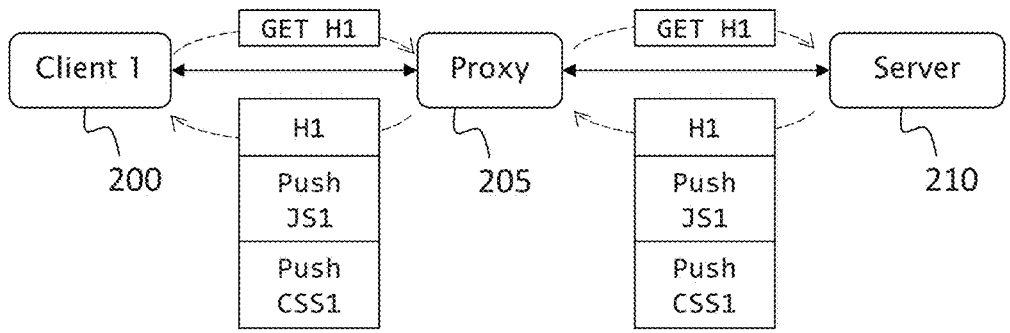
FIGS. 2a to 2e, illustrates several scenarios of embodiments of the invention for caching and pushing data to a client device.

FIG. 2a illustrates a simple scenario for accessing a web page such as the web page 100 of FIG. 1a, composed of the main HTML resource H1 that uses the JavaScript resource JS1 for handling some dynamic content and that uses the CSS resource CSS1 for styling the HTML content of H1.

As illustrated, client device 200 sends a request to proxy 205 to obtain the main HTML resource H1. Since the resource itself is to be obtained, the request is typically a request of type GET comprising the URL of resource H1. Moreover, since the response to the request is not cached in proxy 205, the request is forwarded to server 210.

Server 210 replies to the request by sending resource H1 to proxy 205 and by pushing resources JS1 and CSS1 to proxy 205 on a standard basis.

Upon receiving resource H1, proxy 205 forwards it to client device 200, in response to the initial request.

In addition, proxy 205 replicates the pushes made by server 210, by pushing resources JS1 and CSS1 to client device 200, in connection with the initial request for obtaining resource H1.

The proxy also stores all the resources H1, JS1, and CSS1 in its cache memory for future uses.

According to an embodiment, proxy 205 stores a list of the resources pushed in response to the request for resource H1, that is to say a list of the resources JS1 and CSS1. This list is stored in relation with the cache entry for resource H1.

Figure 2B:
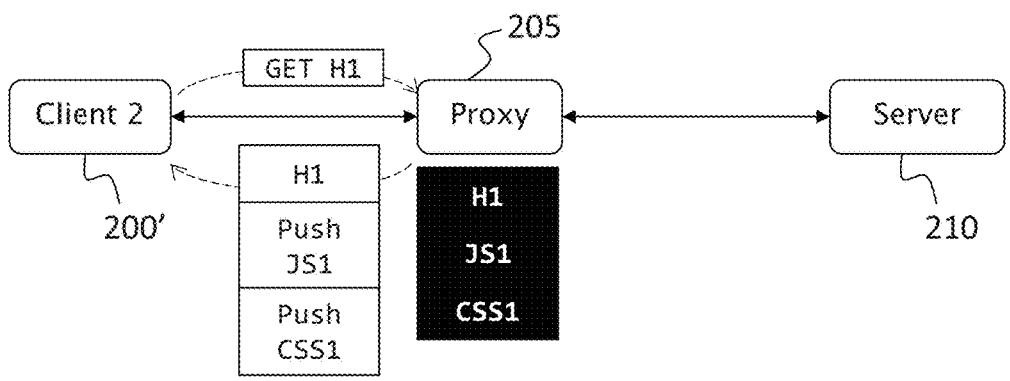

FIG. 2b illustrates another scenario for accessing the same web page as the one accessed in the scenario illustrated in FIG. 2a, after this page has been accessed by a first client device, i.e., when the requested resources are stored in the cache memory of the proxy.

As illustrated, a second client device 200' sends a request to proxy 205 to obtain the main HTML resource H1. Again, the request is typically a request of type GET comprising the URL of resource H1.

Since resource H1 has been already stored in the cache memory of proxy 205, the latter fetches the resource from its cache memory to send it back to the client device. In addition, it fetches the list of resources to push in response to a request for resource H1, that is to say the resources JS1 and CSS1. Accordingly, proxy 205 pushes resources JS1 and CSS1 to client device 200', in connection with the request for resource H1.

Figure 2C:
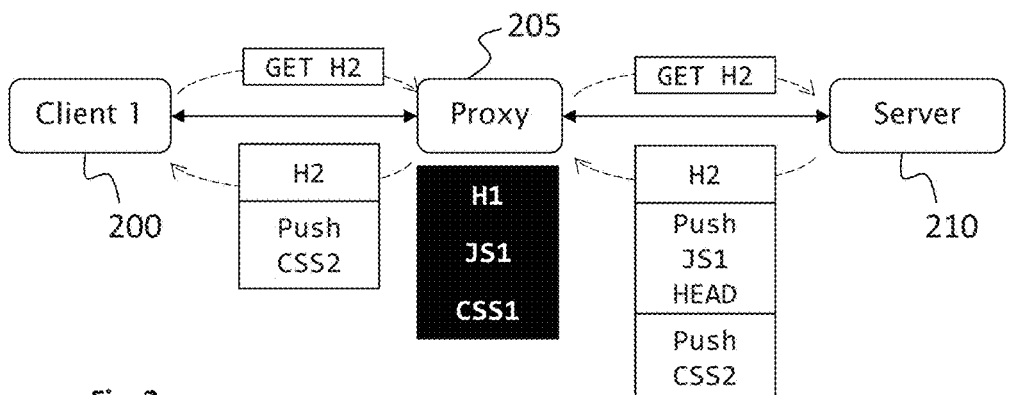

FIG. 2c illustrates a scenario for accessing a web page different from the one accessed in the scenarios illustrated in FIGS. 2a and 2b but sharing one or more resources with this web page (e.g. resource JS1). For the sake of illustration, it is considered that the scenario illustrated in FIG. 2c occurs after the one illustrated in FIG. 2a.

As illustrated, client device 200 sends a request to proxy 205 to obtain the main HTML resource H2. Again, the request is typically a request of type GET comprising the URL of resource H2.

Since the response to the request is not in its cache, proxy 205 transmits the request to server 210.

In response, server 210 sends resource H2 to proxy 205.

For the sake of illustration, it is assumed that resources JS1 and CSS2 are associated with resource H2 and that resource JS1 has been previously stored in the cache memory of client device 200 (and is not stale).

It is also assumed that server 210 knows that it has already sent resource JS1 to proxy 205 (and that resource JS1 is not stale in the proxy's cache). As a consequence, server 210 pushes the resource as a response to a HEAD request for JS1. This means it only sends metadata associated with resource JS1 (i.e. the header fields) but not the resource itself.

In addition the server pushes resource CSS2 (as a response to a GET request).

Upon receiving these two pushes, proxy 205 can build a list of resources (JS1 and CSS2) associated with resource H2. It can store this list in its cache.

Then, proxy 205 replies to the client device request by sending resource H2. In addition, knowing that the requesting client device 200 is a final client (and not an intermediary) and that the client device has already resource JS1 in its cache, it only pushes resource CSS2.

Figure 2D:
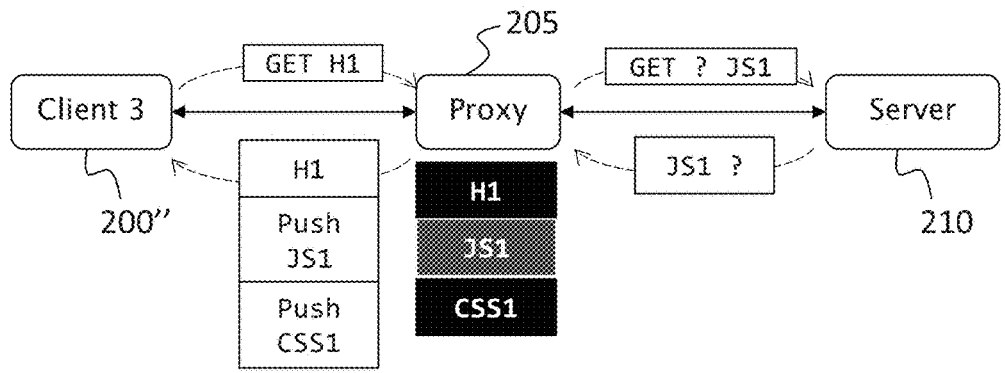

FIG. 2d illustrates a scenario for accessing the same web page as the one accessed in the scenario illustrated in FIG. 2a, after this page has been accessed by a first client device, i.e. when the requested resources are stored in the cache memory of the proxy and when at least one of these resources is stale.

As illustrated, client device 200" sends a request to proxy 205 to obtain the main HTML resource H1. Again, the request is typically a request of type GET comprising the URL of resource H1.

Upon reception of the request from client device 200", for transmitting resource H1, proxy 205 uses its cache content to respond to this request by transmitting resource H1. It also gets the list of resources to push and discovers that one of the auxiliary resources, resource JS1, is stale.

Proxy 205 starts transmitting resource H1 to client device 200" and sends a conditional request to server 210 for updating resource JS1.

As mentioned above, a conditional request is a request for obtaining an updated version of previously stored resources or an indication that these resources are still valid.

While proxy 205 cannot push resource JS1 to client device 200" before receiving a response from the server, it can still send the promise that it will push resource JS1 (i.e. proxy 205 sends a PUSH_PROMISE frame for resource JS1).

Upon receiving a response from the server, proxy 205 updates its cache memory (either by extending the validity of resource JS1 or by storing the new version), and pushes the resource to the client device.

Figure 2E:
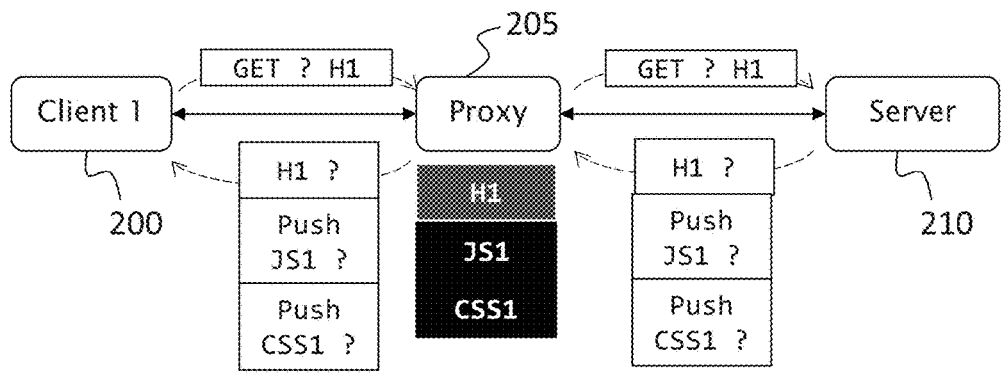

FIG. 2e illustrates a scenario that may arise when a main resource is stale at the client device end. This scenario is assumed to arise after the one described by reference to FIG. 2a.

Upon receiving a conditional request from client device 200 for resource H1, proxy 205 looks for the state of resource H1 in its cache memory.

If resource H1 is stale in the cache memory of proxy 205, the latter sends a conditional request to server 210. The server responds to this conditional request by either sending a new version of resource H1 (that happens if resource H1 has been modified) or by extending the validity period of resource H1 (for example by sending a response with the 304 status code).

In addition, server 210 advantageously pushes the auxiliary resources linked to resource H1, i.e. auxiliary resources JS1 and CSS1.

If resource H1 has been modified, server 210 pushes all the auxiliary resources (since the list of resources to push in response to a request for resource H1 may have changed).

All the data of a new auxiliary resource (i.e. an auxiliary resource not stored in the proxy cache) or an updated auxiliary resource are pushed (as a response to a GET request) while only metadata of an auxiliary resource present and valid in the proxy cache are pushed (as a response to a HEAD request). According to a particular embodiment, a stale auxiliary resource stored in the proxy cache and unchanged in the server is pushed as a response to a conditional GET request with the 304 status code (i.e. this means that the resource was unchanged, and no data is transmitted).

On the contrary, if resource H1 has not been modified, only stale auxiliary resources stored in the proxy cache are pushed, either as updates or as responses with the 304 status code.

Once the response and the possible pushes have been received by proxy 205 from server 210 or if resource H1 is not stale in the proxy cache, the proxy responds to the request of client device 200 by sending either an updated version of resource H1 or by sending a response with the 304 status code.

In addition, proxy 205 pushes any stale auxiliary resource stored in the proxy cache, either as updated versions or as responses to conditional GET requests with the 304 status code. It also pushes any new auxiliary resource if resource H1 has been modified and uses new auxiliary resources. Knowing that client device 200 is a final client, proxy 205 pushes only new resources, updated resources, or stale resources. It doesn't push valid resources present in client device 200 cache.

If resource H1 is valid in proxy 205 cache, then proxy 205 can respond directly to client device 200 request, without contacting the server.

Upon receiving a GET request for resource H1, if resource H1 is stale in proxy 205 cache, then proxy 205 sends a conditional request to server 210, as described above.

According to the examples described by reference to FIGS. 2a to 2e, a client device is configured to communicate with a proxy that, in turn, communicates with a server. However, it is to be understood that the invention is not limited to that configuration. In particular, the caching proxy can be an element of the client device or of the server. Likewise, several caching proxies can be arranged between a client device and a server.

Figure 3:
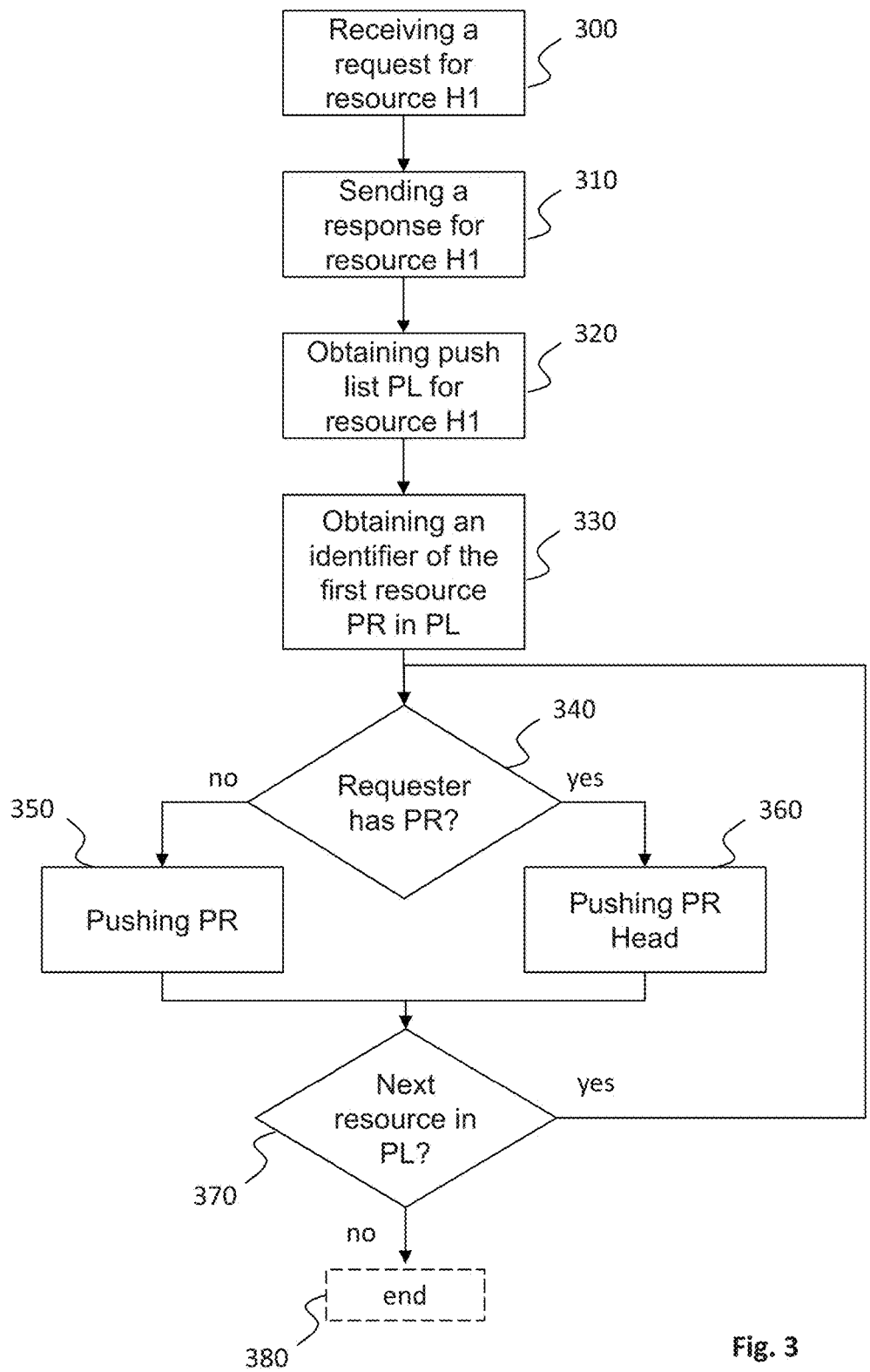
FIG. 3 illustrates steps of an example of an algorithm implemented in a server for helping a caching proxy to determine a list of resources to push in response to a request for a specific resource.

For the sake of clarity, the algorithm illustrated in FIG. 3 only considers two entities, which can be either a client device and a proxy, a proxy and a server, or a proxy and another proxy. FIG. 4 considers three entities, with a proxy in the middle, which can receive requests either from a client or from another proxy, and which can send requests either to a server or to another proxy.

FIG. 3 illustrates steps of an example of an algorithm implemented in a server for helping a caching proxy to determine a list of resources to push in response to a request for a specific resource.

As illustrated, the server receives a request for a resource H1 in a first step (step 300).

Then, in a following step (step 310), the server starts sending a response to the received request (i.e. a response associated with resource H1), that is to say sending the header fields associated with the requested resource and/or sending the resource itself.

It is to be noted that for the sake of clarity, the transmission of the response associated with requested resource H1 (i.e. resource H1 and associated metadata) is illustrated in a single step. However, according to the HTTP/2 specification, the promise of a pushed resource (i.e. the transmission of the PUSH_PROMISE frame) should happen before any reference to the pushed resources is transmitted.

Therefore, to avoid any risk of conflict (and to be conservative), these promises can be sent before transmitting the resource H1 itself. A simple solution consists in sending the header fields for resource H1 at step 310 and to wait until step 380 to transmit the resource H1 itself.

It is also to be noted that the transmission of resource H1 and of information regarding the pushed resource can be interleaved. Therefore, the transmission of all these resources can be done at step 380.

Next, at step 320, the server gets a list denoted PL of resources to push in response to the request for resource H1.

Figure 1B:
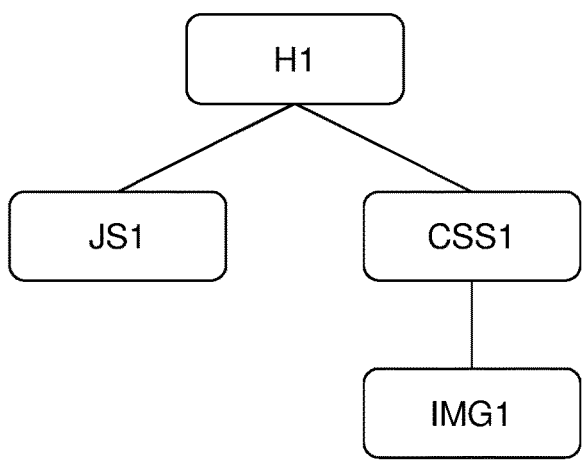
Figure 1C:
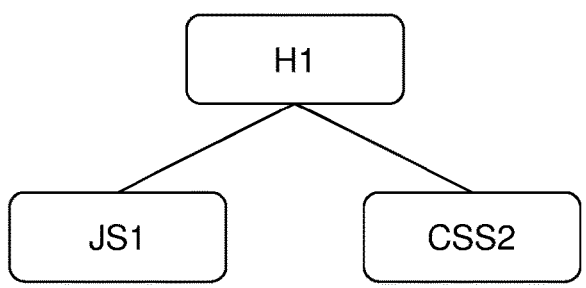

This list may come from several sources. It may have been handcrafted by a designer of the web page. It may have been built by a tool that parses resource H1 and any auxiliary resource that are referenced in resource H1 (in order to create a data structure that looks like those described in FIGS. 1a to 1c and to generate the list from this structure). The tool may have some specific rules for selecting which resources referenced in resource H1 should be included within the list. The list may also be built by analysing the requests received by the server (as done in the prior art solution known as Jetty).

Then, a test is performed (not represented) to determine whether or not the list PL is empty. If it is empty, the algorithm ends at step 380.

On the contrary, if the list PL comprises one or more resources to push, a reference of the first resource, denoted PR, is obtained from the list PL (step 330).

Then, it is determined whether or not the requester (from which the request has been received at step 300) has already the resource having the reference PR in its cache memory (step 340).

It is to be noted that according to a particular embodiment, this checking step is internal to the server (i.e., it does not need to exchange data with the requester to obtain information about its cache content).

It is assumed here that the server has a good knowledge of the cache content of the requester. Several solutions exist for sharing this information. For example, the server can store the list of resources sent to the requester (at least while the HTTP/2 connection is alive) or the requester can transmit to the server its cache content in some compact way, for example using a Bloom filter.

If the server does not have a good knowledge of the cache content of the requester, it may use heuristics to guess whether the resource having the reference PR is in the requester's cache memory. These heuristics may be based, for example, on the number of pages previously requested by the requester and on the frequency of usage of the resource having the reference PR as an auxiliary resource for a web page. These heuristics may also use information about the requester: a caching proxy has more chance of having resources in its cache memory than a final client device. It is noted that a proxy and a final client device can be recognized, for example, based on the pattern of their requests (a proxy makes much more requests than a client device).

The server may also base its decision on its transmission strategy. If the strategy is to reduce latency not taking into account bandwidth usage, the server considers that the resource having the reference PR is not in the requester's cache memory. On the contrary, if the strategy is to optimize bandwidth usage, potentially increasing latency, the server considers that the resource having the reference PR is already in the requester's cache memory. Between these two divergent strategies, the server may use some characteristics of the resource having the reference PR, such as its frequency of usage as an auxiliary resource, to decide whether or not the resource is to be pushed.

Lastly, the server may consider that the resource having the reference PR is not in the requester's cache memory, and let the requester cancel the push of this resource if the resource was already in its cache. This strategy works better if the latency between the requester and the server is low: the cancelation of the push will reach the server quickly, before it has the time to send a large part of the resource, therefore limiting the waste of bandwidth.

Turning back to FIG. 3, if it is determined at step 340 that the requester does not have the resource having the reference PR in its cache memory, the server pushes the resource having the reference PR to the requester (step 350).

On the contrary, if it is determined that the requester has the resource having the reference PR in its cache memory, the server pushes only metadata of the resource having the reference PR (step 360), that is to say pushes a response corresponding to a HEAD request for the resource having the reference PR. In such a case, only the response header fields corresponding to the resource having the identifier PR are transmitted to the requester (the resource itself is not transmitted). This makes it possible to signal to the requester that the resource having the reference PR is an auxiliary resource of resource H1 and that it is useful to push it toward the end client device.

After the step 350 or the step 360 has been carried out, a test is carried out to determine whether or not there is another resource in the list PL that has not been processed (step 370).

If there is another resource in the list PL that has not been processed, it is selected and the algorithm loops to step 340 to process the selected resource.

On the contrary, if all the resources of the list PL have been processed, the algorithm ends at step 380.

When a server implementing an embodiment of the invention receives a conditional request, it executes an algorithm that is close to the one described by reference to FIG. 3, with a few modifications.

As mentioned above, an object of a conditional request is to make it possible for the server to send a compact response if the resource targeted by the conditional request has not changed.

According to embodiments of the invention, if the requested resource has changed, the server should send back the new version of the resource and should transmit the potentially updated list of auxiliary resources to push in response to this request.

If the requested resource has not changed, the server sends back a response with information such as the 304 status code, indicating to the requester that the resource has not changed. In addition, the server can also send updates for the auxiliary resources that are pushed in response to this request.

Therefore, when replying to a conditional request, the algorithm described by reference to FIG. 3 can be adapted as follows.

During step 310, the server checks whether or not the resource H1 has been updated in comparison to the version that the requester has in its cache. To that end, the server can use the conditional headers present in the request. If the resource H1 has been updated, the server sends the new version as a full response. Otherwise, the server only sends the response header fields, with a code indicating that the resource has not changed, for example a 304 status code.

Then, the algorithm as described by reference to FIG. 3 continues even if the resource H1 has not changed since some of the resources may have been updated although the list of resources to push is expected not to have changed.

At step 340, the test is slightly different.

If the requester does not have the auxiliary resource having the reference PR or if this auxiliary resource has been updated, the algorithm pushes a full response for the auxiliary resource having reference PR at step 350.

If the requester has the auxiliary resource having reference PR and if this resource is stale, the algorithm pushes a response corresponding to a conditional GET request with the 304 status code, at step 360, instead of pushing a response corresponding to a HEAD request.

If the requester has the auxiliary resource having reference PR and if this auxiliary resource is still valid but the resource H1 has been updated, the algorithm pushes a response corresponding to a HEAD request at step 360. This is done to update the list of pushed auxiliary resources for the request.

Otherwise (i.e. if the requester has the auxiliary resource having reference PR, if this auxiliary resource is still valid and if resource H1 is also valid), the algorithm loops directly to step 370.

To determine whether or not an auxiliary resource (e.g. auxiliary resource having reference PR) has been updated in comparison to the version present in the requester cache or to determine whether or not the auxiliary resource in the requester cache is stale, the server can use its knowledge of the requester cache.

If this knowledge is not available or if it is lacking precision, it can use heuristics. For example, the server can use information contained in the header fields present in the conditional request to determine which version of the auxiliary resource (PR) the requester has in its cache. If an 'If-Modified-Since' header field is present, the server can assume that the version of the auxiliary resource (PR) in the requester cache is the one that was available at the date indicated by the header field or an older one. Alternatively, if an 'If-None-Match' header field is present, the server may need to find the creation date of the version of the resource H1 corresponding to the entity-tag present in the header field and then use this date to find the version of the auxiliary resource (PR) present in the requester cache.

Using the conditional header fields present in the request may not be sufficiently precise for auxiliary resources that are frequently updated or that have short validity duration. To better handle these cases, the server can store the last time each resource was transmitted to the requester and use this information during step 340.

Alternatively, the server could avoid using any heuristic when this knowledge is not available but use instead one of the two following strategies.

According to a first strategy, the server may consider that the requester does not have the latest version of the auxiliary resource (PR) and thus decide to push a full response for this auxiliary request. This ensures that the requester receives the resource quickly but at the cost of wasting bandwidth if the requester already has the resource.

According to a second strategy, the server may consider that the requester has the latest version of the auxiliary resource (PR) and choose to push a response with the 304 status code corresponding to the latest version of this resource. In such a case, if the requester does not have this version of the resource, it can request it from the server. This incurs a delay in the transmission of the resource but prevents wasting bandwidth if the requester already has the latest version of the resource.

The choice of one of these strategies may be based on the network conditions between the requester and the server. If the available bandwidth is high, then pushing the whole resource may be more efficient. On the contrary, if the latency is low, then pushing only a response with the 304 status code may be more efficient. The decision typically depends on both the bandwidth and the latency, and potentially on the traffic between the requester and the server. For example, if the server has many resources to push to the requester, it may prefer pushing responses with the 304 status code.

It is to be noted that if the server knows that it is responding to requests from a final client device, it can use a slightly modified algorithm. In particular, step 360 can be modified so as to avoid pushing responses corresponding to HEAD requests (since these pushed messages are used to inform the requester of which auxiliary resources to push in response to a request for a specific resource and this information is not useful to a final client device).

However, when responding to a conditional request, the server still has to push responses with the 304 status code in step 360, to revalidate stale resources.

When a caching proxy receives a request from a client device or from another proxy, it applies a modified version of the algorithm described in FIG. 3.

Between step 300 and step 310, the proxy checks whether or not the requested resource H1 is present in its cache.

This can be done by an algorithm such as the one described by reference to FIG. 4.

At the beginning of step 340, the proxy checks whether or not the version of the auxiliary resource having the reference PR, stored in its cache, is valid. If it is not valid, it makes a conditional request to the server for either updating the auxiliary resource (PR) or revalidating it. In this case, it pushes a response to a conditional request to the requester. It can promise this push by sending a PUSH_PROMISE frame containing this conditional request. If the response from the server is a new version of the auxiliary request (PR), the proxy pushes this new version to the requester. Otherwise, the proxy pushes a response with the 304 status code to the requester.

This particular case supersedes all the previously described cases for step 340, including those described when responding to conditional requests.

Figure 4:
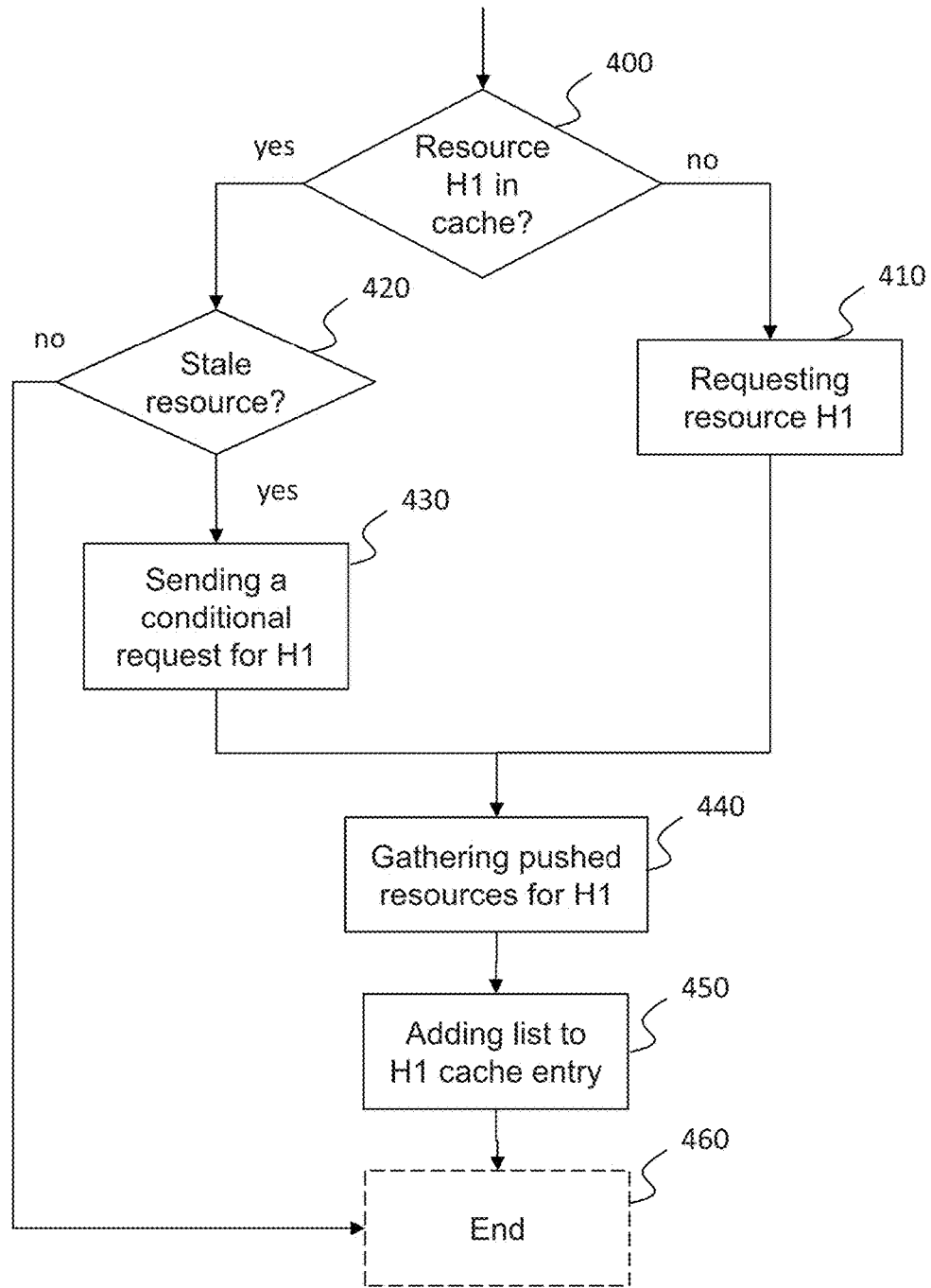
FIG. 4 illustrates an example of steps that can be carried out by a proxy to handle its cache memory while replying to requests.

FIG. 4 illustrates an example of steps that can be carried out by a proxy to handle its cache memory while replying to requests.

In a first step (step 400), the proxy checks whether or not the resource H1 is stored in its cache memory (the resource H1 corresponding to the request received at step 300).

To that end, it may apply the rules of HTTP caching (taking into account the request method, the 'Host' header field, the request target, as well as information extracted from the 'Vary' header field). In other words, the proxy verifies that the correct representation of resource H1 is present in its cache memory (a representation, in HTTP terminology, is a specific version of a resource, identified by some of its header fields; for the sake of illustration, an image can have two versions, one using the jpeg format and another one using the png format; the format of the image is specified in the 'Content-Type' header field of the response).

If the resource H1 is not present in the cache memory of the proxy, the proxy requests it from the server (step 410).

On the contrary, if the resource H1 is present in the cache memory of the proxy, the proxy checks whether or not it is still valid (step 420).

If the resource H1 is still valid, the algorithm ends at step 460.

On the contrary, if the resource H1 is stale, the algorithm sends a conditional request related to resource H1 at step 430.

Then, after step 410 or step 430, the proxy builds a list of all the resources pushed in response to the request related to resource H1 (step 440). To that end, it may obtain all the PUSH_PROMISE frames sent by the server on the stream corresponding to the request for obtaining resource H1.

If the proxy made a conditional request for the resource H1 at step 430 and if the received response indicated that the resource H1 has not changed, the list of the resources to push in response to a request for resource H1 is kept unchanged (step 440). However, it is to be noted that some of the resources in the list may have changed and the new version have been received from the server.

Then, at step 450, the proxy adds this list to the cache entry corresponding to the resource H1. According to particular embodiments, this list is added only to the cache entry for the representation of resource H1 corresponding to the request received in step 300.

Once the list is stored in the cache entry for resource H1, the algorithm ends in step 460. Then, the proxy continues processing the request at step 310 of the algorithm illustrated in FIG. 3.

It is to be noted that a caching proxy can integrate other sources of information to decide which resources to push to a requester when responding to a request. For example, the caching proxy may gather statistics on received requests (for example as Jetty does) in addition to storing the list of pushed resources by the server. The list of the resources pushed by the caching proxy can be the union of these two lists, their intersection, or any other combination.

The caching proxy can also store information about pushes that are cancelled by the clients, and stop pushing a resource that clients frequently cancel.

Some resources may have very small freshness duration. For example, a resource may be sent with the 'no-cache' response directive to indicate that it should not be reused without being validated by the server. HTTP/2 defines rules for the validity duration of such a resource when it is pushed: the pushed resource is valid as long as the stream corresponding to the client's request is open. If possible, these rules should be followed. However, it may be difficult to apply them when the caching proxy receives requests from several clients. In such a case, it may be easier to mark the cache entry of the pushed resource as valid for a very short duration, corresponding mostly to the duration a stream is kept open between the caching proxy and the server. This may be for example a few 10 s of milliseconds up to a few 100 s of milliseconds.

In addition, such a resource should not be stored in cache memory. Nevertheless, the proxy may include such a resource in the list of resources to push in response to a request. However, the caching proxy will have no corresponding cache entry for this resource. Upon receiving a request for a resource whose list contains a non-cacheable resource, the proxy will send a request to the server for the non-cacheable resource in order to be able to push it to the client.

As described above, the list of resources to push in response to a request is stored, within a proxy, in the cache entry corresponding to this request.

According to embodiments, a cache entry is defined by its key and its content. The key is the set of elements from a request and the values they must match for the response stored in the cache entry to be relevant for the request. The minimal key is the URL of the request (and, for completeness, the request method and the 'Host' header field). The content of the cache entry is the resource corresponding to the request, as well as the metadata linked to this resource (for example, the header fields contained in the response received from the server for the request).

The key for the cache entry can be modified by the response sent by the server through the 'Vary' header field. This header field lists all the header fields from the request that influenced the response: changing the value of any of these request header fields may change the response sent by the server.

More fine grained mechanism could be defined for specifying the parts of the request that influence the response from the server (see for example: https://tools.ietf.org/html/draft-fielding-http-key-02). For example, the server could indicate that only a part of the value of a request header field was used when building the response.

A list of resources to push in response to a request is linked to the cache entry for this request. However the factors influencing the response may differ from the factors influencing the list of resources to push.

For example, the response may be independent of the resolution of the client device's screen while one of the pushed images may depend on it. This can happen with the web page described in reference to FIG. 1b: resources H1, JS1 and CSS1 are all independent of the resolution of the client device's screen. However, depending on this resolution, two versions of IMG1 are available (e.g. IMG1-low for low resolution devices and IMG1-high for high resolution devices). The correct version is selected by a test inside of resource CSS1. For optimizing the transfer of the web page, the list of pushed resources should depend on the request header field describing the resolution of the client device's screen (see for example "HTTP Client Hints", Ilya Grigorik, http://tools.ietf.org/html/draft-grigorik-http-client-hints-02).

To inform the proxy, a 'VaryPush' header field can be introduced. It lists all the request header fields that influence the list of pushed resources, in addition to the request header fields listed by the 'Vary' header field.

If this 'VaryPush' header field is present, the cache entry contains one or more lists of resources to push: one for each set of values it has received for the request header fields listed in the 'VaryPush' header field.

For example, the response to the request for resource H1 would be the following:

HTTP/1.1 200 OK
Vary: Accept-Encoding, Accept-Language
VaryPush: DPR
. . .

On the contrary, the list of resources to push may be independent of some factors influencing the response. For example, in the case of the web page described by reference to FIG. 1a, the resource H1 may depend on the 'Accept-Language' header field (which describes the language used in the resource) as it contains text that can be translated in different languages (there may be an English version and a French version of the HTML). But the JS1 and CSS1 resources may be independent of this header field as they do not contain text that is shown to the user (there is only one version of each of these resources, valid for both English and French).

To inform the proxy, an 'InvaryPush' header field can be introduced. It lists all the request header fields listed in the 'Vary' header field that do not influence the list of pushed resources. As a consequence, the list of resources to push can be shared between several cache entries.

For example, the response to the request for H1 would be the following:

HTTP/1.1 200 OK
Vary: Accept-Encoding, Accept-Language
InvaryPush: Accept-Language
. . .

Supporting the features known as VaryPush and InvaryPush may modify the processing associated with the algorithms described by reference to FIG. 3 and to FIG. 4.

In the algorithm illustrated in FIG. 3, the test performed during step 340 for determining whether or not the requester has the auxiliary request having the reference PR is further modified upon receiving a conditional request for a resource H1. In such a case, if the resource H1 has not been updated, the server further checks whether or not the list of auxiliary resources associated with resource H1 has already been transmitted. To that end, it determines the representations of the resource H1 for which it sent the list of auxiliary resources, taking into account the content of the 'VaryPush' header field sent for these representations. If no list has been sent for the representation targeted by the request, the server handles the test of step 340 as if the resource H1 had been updated.

If the server does not have any means for determining which lists have already been sent, it considers that the list corresponding to the targeted representation has not been sent.

In addition, this same step is also modified for all requests (conditional or not). The server checks whether the list of auxiliary resources has already been transmitted for another representation matching the representation targeted by the request according to the 'InvaryPush' header field. If this is the case, the server only transmits pushes corresponding to responses with the 304 status code.

Step 420 is modified to check whether or not the cache entry for the resource H1 has a list of auxiliary resources matching the request received for the resource H1 according to the value of the 'VaryPush' header field. If the cache entry for the resource H1 does not have a list of auxiliary resources matching the request received for resource H1 according to the content of the 'VaryPush' header field, the proxy executes next step of the algorithm (i.e. step 430), by sending a conditional request for resource H1 to obtain the specific list.

Step 410 is also modified to check whether or not an existing cache entry for another representation of resource H1 has a list of auxiliary resources matching the request received for resource H1 according to the value of the 'InvaryPush' header field. If this is the case, this list is used for the new cache entry that will be created for the new representation of resource H1.

At step 450, the proxy takes into account the 'VaryPush' and 'InvaryPush' header fields for storing the list of auxiliary resources.

If the proxy supports the 'VaryPush' header field as described here after, several lists can be added to the cache entry for the resource H1. Each list is associated with a key derived from the values of the header fields indicated in the 'VaryPush' header field contained in the response for the resource H1.

If the proxy supports the 'InvaryPush' header field, this header field is stored globally with the set of cache entries for the resource H1. When a new cache entry is created for a new representation of resource H1, the content of this header field is read, to determine if the list of the resources to push in response to a request for this new representation can be derived from the list stored in an existing cache entry for the resource H1.

Another possibility that is similar to the use of the 'VaryPush' header field is to indicate that a resource inside a list of auxiliary resources associated with a request has a representation that depends on some of the header fields present in the request. This is indicated by adding a 'Vary' header field in the response for the auxiliary resource indicating the header fields that should be taken into account.

According to the previous example, the same resource IMG1 is pushed for all resolutions however, the representation of IMG1 depends on the resolution.

As such, the response to the request for resource H1 may be as follows:

HTTP/1.1 200 OK
Vary: Accept-Encoding, Accept-Language
. . .
And the pushed response for IMG1 would be:
HTTP/1.1 200 OK
Vary: DPR
. . .

A proxy knows that for a request for resource H1 with a different value for the 'DPR' header field, a different representation of resource IMG1 has to be pushed. In this case, during step 340 of FIG. 3, the proxy sends a request to the server for retrieving the correct representation of resource IMG1.

It should be noted that inside a list of pushed resources, a given resource is identified by the key associated with its cache entry.

The cache entry can store the list of pushed resources either as an unordered list or as an ordered list. Storing the order can present advantages when the server tries to optimize the responsiveness of the client device by sending the most important resources first. In particular, for an optimized web page, CSS resources should be transmitted first, while JavaScript resources should be transmitted last. To achieve this when the client downloads the web page, CSS resources are linked to the top of the HTML resource while JavaScript resources are linked to the bottom of it. For optimizing the perceived performance of the web page, the server could replicate this transmission when pushing the resources.

It is to be noted that the server may use more complex strategies for pushing resources: it may push some resources in parallel, while using a sequential transmission mode for other resources. For example, a server may first push all the CSS resources in parallel, then push all the media resources in parallel, and last, push the JavaScript resources in parallel. The proxy may try to detect this strategy or some aspects of it and store this with the list of pushed resources so as to replicate it when pushing these resources to a client device.

According to embodiments of the invention, the server pushes responses to HEAD requests for including a resource in a list of auxiliary resources without pushing the whole resource. Such a use of pushing HEAD responses could be the source of interaction problems with other uses of pushing HEAD responses.

To cope with such problems, a solution consists in adding a flag indicating the meaning of a pushed HEAD response. This flag could take the form of a specific header field or be a part of an existing header field.

For example, the server may include the header field 'Push-Policy: prefetch' in HEAD responses sent to the requester in order to indicate that the resource is a candidate for prefetching from the client side. In this case the server also includes the same header field in the response to the main request (either as an independent header field or as an item in the list of values for the main Push-Policy header field).

On the contrary, the server may include the header field 'Push-Policy: implicit' in the pushed HEAD responses sent to the requester to indicate that the resource should be included in the list of resources to push in response to the main request.

Upon seeing one of these headers, a caching proxy would be able to determine whether the pushed HEAD response is to be included in the list of resources to push in response to the main request.

A caching proxy may try to cache in advance resources before they are requested by a requester. This enables the proxy to answer directly to a request from a requester without contacting the server. This prefetching could be based for example on the content of the HTTP Link header field, or of its equivalent HTML link element. In this case, step 300 is replaced by a prefetching determination step, where the proxy obtains a resource to prefetch.

Figure 5:
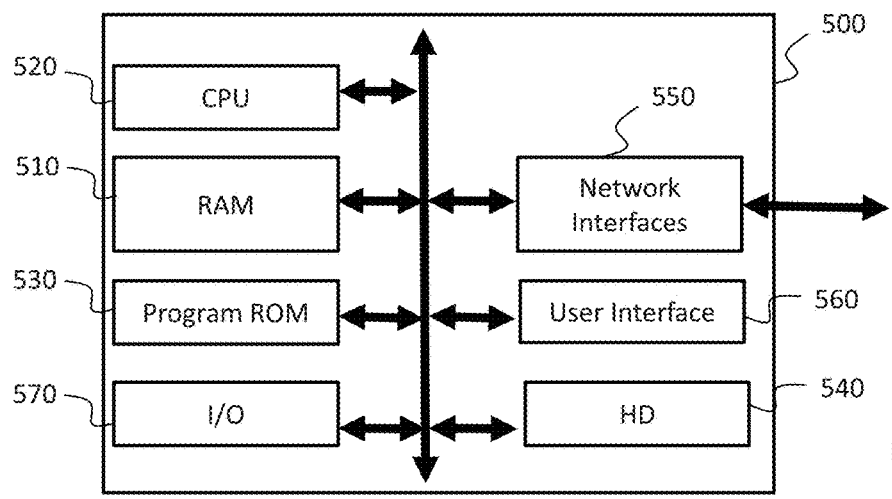
FIG. 5 is a schematic illustration of devices according to embodiments.

FIG. 5 is a schematic illustration of a device 500 according to embodiments. The device may be a server, a client or a proxy. The device comprises a RAM memory 510 which may be used as a working memory for a control unit 520 configured for implementing a method according to embodiments. For example, the control unit may be configured to execute instructions of a computer program loaded from a ROM memory 530. The program may also be loaded from a hard drive 540.

The device also comprises a network interface 550 which may be a single network interface, or comprise a set of network interfaces (for instance several wireless interfaces, or several types of wired or wireless interfaces). The device may comprise a user interface 560 for displaying information to a user and for receiving inputs from the user.

The device may also comprise an input/output module 570 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations of the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for pushing at least one second resource associated with a first resource, in response to a request for the first resource, the method being carried out in an intermediary component comprising a memory, the method comprising:
    receiving a first request for a first resource;
    sending a request for the first resource to a second component different from the intermediary component;
    receiving from the second component, in response to the sent request, at least one identifier of at least one second resource to be pushed by the second component;
    storing at least one of said at least one received identifier in a list associated with the first resource, the list being stored in the memory;
    receiving a second request for the first resource from a client device;
    transmitting the first resource to the client device;
    selecting at least one second resource identified in the list associated with the first resource; and
    pushing the selected at least one second resource to the client device.

2. The method of claim 1, wherein the list is stored in association with the first resource and in association with an item of information, the item of information being an item of information sent to the second component as part of the request for the first resource and being different from an identifier of the first resource.

3. The method of claim 1, wherein at least one received identifier is received as a part of the pushed transmission of a resource corresponding to said at least one received identifier by the second component.

4. The method of claim 1, wherein selecting at least one second resource comprises:
    obtaining the list associated with the first resource from the memory, the list being obtained as a function of the first resource requested in the second request; and
    selecting at least one identifier of at least one resource listed in the obtained list.

5. The method of claim 4, wherein the list is obtained as a function of the first resource requested in the second request and as a function of an item of information of the second request, the item of information of the second request being different from an identifier of the first resource.

6. The method of claim 4, wherein the obtaining comprises:
    identifying a plurality of lists associated with the first resource, the lists being identified as a function of the first resource requested in the second request; and
    selecting one of the identified lists as a function of an item of information of the second request, the item of information being different from an identifier for the first resource.

7. The method of claim 4, further comprising checking whether or not the at least one second resource corresponding to the at least one selected identifier is stored in the memory.

8. The method of claim 7, further comprising requesting and receiving the at least one second resource corresponding to the at least one selected identifier if it is determined that the at least one second resource corresponding to the at least one selected identifier is not stored in the memory, the at least one second resource corresponding to the at least one selected identifier being requested from the second component.

9. The method of claim 4, further comprising checking whether or not the at least one second resource corresponding to the at least one selected identifier is valid.

10. The method of claim 9, further comprising requesting the at least one second resource corresponding to the at least one selected identifier if it is determined that the at least one second resource corresponding to the at least one selected identifier is not valid, the at least one second resource corresponding to the at least one selected identifier being requested from the second component.

11. The method of claim 4, further comprising:
    receiving a cancellation request for a resource being pushed;
    modifying the obtained list by removing from the obtained list an identifier of the resource being pushed.

12. The method of claim 4, further comprising:
    receiving a request for a resource referring to the first resource; and
    modifying the obtained list by adding to the obtained list an identifier of the resource referring the first resource.

13. The method of claim 1, further comprising checking whether or not the requested first resource is stored in the memory of the intermediary component and whether or not the requested first resource stored in the memory is valid.

14. The method of claim 13 wherein the second request for the first resource is forwarded to the second component as a conditional request.

15. The method of claim 1, further comprising forwarding the second request for the first resource and receiving at least one response to a request for the first resource in response to forwarding the second request.

16. A non-transitory computer-readable storage medium storing instructions of a computer program that when executed cause one or more processors to perform a method, the method comprising:
receiving a first request for a first resource;
sending a request for the first resource to a second component different from the intermediary component;
receiving from the second component, in response to the sent request, at least one identifier of at least one second resource to be pushed by the second component;
storing at least one of said at least one received identifier in a list associated with the first resource, the list being stored in the memory;
receiving a second request for the first resource from a client device;
transmitting the first resource to the client device; selecting at least one second resource identified in the list associated with the first resource; and
pushing the selected at least one second resource to the client device.

17. A device for pushing at least one second resource associated with a first resource, in response to a request for the first resource, the device comprising a memory and a processor configured for carrying out a process comprising:
receiving a first request for a first resource;
sending a request for the first resource to a component different from the device;
receiving from the component, in response to the sent request, at least one identifier of at least one second resource to be pushed by the component;
storing at least one of said at least one received identifier in a list associated with the first resource, the list being stored in the memory;
receiving a second request for the first resource from a client device;
transmitting the first resource to the client device;
selecting at least one second resource identified in the list associated with the first resource; and
pushing the selected at least one second resource to the client device.

18. The device of claim 17, wherein the list is stored in association with the first resource and in association with an item of information, the item of information being an item of information sent to the component as part of the request for the first resource and being different from an identifier of the first resource.

19. The device of claim 17, wherein at least one received identifier is received as a part of the pushed transmission of a resource corresponding to said at least one received identifier by the component.

20. The device of claim 17, wherein the processor is further configured so that the selecting at least one second resource comprises:
obtaining the list associated with the first resource from the memory, the list being obtained as a function of the first resource requested in the second request; and
selecting at least one identifier of at least one resource listed in the obtained list.

21. The device of claim 20, wherein the list is obtained as a function of the first resource requested in the second request and as a function of an item of information of the second request, the item of information of the second request being different from an identifier of the first resource.

22. The device of claim 20, wherein the processor is further configured so that the obtaining comprises:
identifying a plurality of lists associated with the first resource, the lists being identified as a function of the first resource requested in the second request; and
selecting one of the identified lists as a function of an item of information of the second request, the item of information being different from an identifier for the first resource.

23. The device of claim 20, wherein the process further comprises checking whether or not the at least one second resource corresponding to the at least one selected identifier is stored in the memory.

24. The device of claim 23, wherein the process further comprises requesting and receiving the at least one second resource corresponding to the at least one selected identifier if it is determined that the at least one second resource corresponding to the at least one selected identifier is not stored in the memory, the at least one second resource corresponding to the at least one selected identifier being requested from the component.

25. The device of claim 20, wherein the process further comprises checking whether or not the at least one second resource corresponding to the at least one selected identifier is valid.

26. The device of claim 25, wherein the process further comprises requesting the at least one second resource corresponding to the at least one selected identifier if it is determined that the at least one second resource corresponding to the at least one selected identifier is not valid, the at least one second resource corresponding to the at least one selected identifier being requested from the second component.

27. The device of claim 20, wherein the process further comprises:
receiving a cancellation request for a resource being pushed; and
modifying the obtained list by removing from the obtained list an identifier of the resource being pushed.

28. The device of claim 20, wherein the process further comprises:
receiving a request for a resource referring to the first resource; and
modifying the obtained list by adding to the obtained list an identifier of the resource referring the first resource.

29. The device of claim 17, wherein the process further comprises checking whether or not the requested first resource is stored in the memory of the device and whether or not the requested first resource stored in the memory is valid.

30. The device of claim 29, wherein the processor is further configured so that the second request for the first resource is forwarded to the component as a conditional request.

31. The device of claim 17, wherein the process further comprises receiving at least one response to a request for the first resource in response to forwarding the second request.

* * * * *